US008430987B2

(12) United States Patent
Simons

(10) Patent No.: US 8,430,987 B2
(45) Date of Patent: Apr. 30, 2013

(54) METHOD FOR APPLYING MARKINGS TO SUBSTRATE SURFACES BY MEANS OF A TRANSFER METHOD

(76) Inventor: Gisela Simons, Nottuln (DE)

( * ) Notice: Subject to any disclaimer, the term of this patent is extended or adjusted under 35 U.S.C. 154(b) by 411 days.

(21) Appl. No.: 12/518,399

(22) PCT Filed: Dec. 14, 2007

(86) PCT No.: PCT/EP2007/010996
§ 371 (c)(1),
(2), (4) Date: Jun. 9, 2009

(87) PCT Pub. No.: WO2008/086871
PCT Pub. Date: Jul. 24, 2008

(65) Prior Publication Data
US 2010/0018640 A1    Jan. 28, 2010

(30) Foreign Application Priority Data
Dec. 21, 2006  (DE) .......................... 10 2006 061 798

(51) Int. Cl.
*B32B 37/14*       (2006.01)
(52) U.S. Cl.
USPC ........ 156/247; 156/231; 156/246; 156/308.2; 340/572.1
(58) Field of Classification Search .................. 156/230, 156/231, 239–241, 242, 243, 246, 308.2; 156/308.4, 309.6, 582; 340/572.1
See application file for complete search history.

(56) References Cited

U.S. PATENT DOCUMENTS

| | | | | |
|---|---|---|---|---|
| 4,644,039 A * | 2/1987 | Boyd et al. | ..................... | 525/422 |
| 5,902,437 A * | 5/1999 | McDonough et al. | ........ | 156/234 |
| 6,050,622 A | 4/2000 | Gustafson | | |
| 6,375,780 B1 * | 4/2002 | Tuttle et al. | ................... | 156/226 |
| 7,049,962 B2 * | 5/2006 | Atherton et al. | ........... | 340/572.1 |
| 2001/0043162 A1 | 11/2001 | Babb | | |
| 2003/0062119 A1 | 4/2003 | Hohberger et al. | | |
| 2004/0177492 A1 | 9/2004 | Eckstein et al. | | |
| 2005/0101060 A1 * | 5/2005 | Tsunoda et al. | ............. | 438/127 |
| 2005/0134460 A1 * | 6/2005 | Usami | ........................ | 340/572.7 |
| 2006/0171756 A1 * | 8/2006 | Berson | ......................... | 400/279 |
| 2007/0204493 A1 * | 9/2007 | Foley et al. | ................ | 40/299.01 |

FOREIGN PATENT DOCUMENTS

| | | |
|---|---|---|
| AU | 743556 | 1/2002 |
| EP | 1 271 398 A1 | 1/2003 |
| WO | WO 98/39734 | 9/1998 |
| WO | WO 2006/076667 A2 | 7/2006 |

\* cited by examiner

*Primary Examiner* — Katarzyna Wyrozebski Lee
*Assistant Examiner* — Scott W Dodds
(74) *Attorney, Agent, or Firm* — Greer, Burns & Crain, Ltd.

(57) ABSTRACT

A method for applying markings to substrate surfaces by means of a transfer method, whereby a transfer layer located on a pre-printed release carrier film is transferred from the film onto the substrate surface, creating an adhesive image which has to be destroyed to be removed. The transfer layer comprises at least one RFD module comprising of an RFD chip and an antenna which is printed onto the release carrier film. Preferably, the RFD module is applied to a covering film sheet that can be removed from the release carrier film during transfer, and can be stuck to the substrate surface in an airtight and water-tight manner after the transfer.

16 Claims, 1 Drawing Sheet

METHOD FOR APPLYING MARKINGS TO SUBSTRATE SURFACES BY MEANS OF A TRANSFER METHOD

BACKGROUND OF THE INVENTION

The present invention relates to a method for applying markings onto substrate surfaces using a transfer method in which a transfer layer on a prepared or pre-printed release carrier film is transferred immediately from the release carrier film onto the substrate surface, where it causes an adhesive image to appear that cannot be removed without destroying it.

The term "transfer method" is intended to refer to all printing methods in which a reversed or non-reversed transfer layer is applied to a release transfer film, and said transfer layer is transferred onto another substrate, where it causes an adhesive image to appear that cannot be removed without destroying it. Preferably, first a transferable pattern is created on the transfer film. In general, the pattern is only a printed image formed solely by the color coats. The carrier film is removed after the transfer process. Therefore, only the printed substrate surface is the carrier of the adhesive image.

The present invention is intended for use with all transfer methods. The techniques described below are therefore to be understood as examples. The preamble of the main claim is intended to comprise all known transfer methods in which a transfer layer is transferred onto a substrate surface.

The detachment of the release carrier film can take place for example though detachment of a water-soluble adhesive bond between the release transfer film and the transfer layer; similar to a decal, a bond subsequently takes place between the substrate surface and the transfer layer. For the bonding, for example the rest of the glue remaining on the transfer image is used. The substrate surface can also be correspondingly set or prepared, for example with a thin coating of a bonding agent. Such a transfer method is called a wet transfer method.

Instead of a water-soluble glue, a thin permanent adhesive layer may also be used that can be detached from the release carrier film by mechanical separation. Such a transfer method is called a dry transfer method.

In addition, the hot transfer method is known, in which special printing inks are used that are applied onto the release carrier film as a transfer layer. Subsequently, the carrier film with the transfer layer is pressed onto the substrate with application of heat and pressure and the printing inks of the transfer layer detach from the carrier film. The above-named hot transfer method, also called the hot transfer printing method, is a method that is often used in textile finishing in order to transfer printed images (see the lexicon "Moderne Technik von A bis Z," pub. TÜV Rheinland GmbH, Cologne, 1991; article. "Transfer printing").

The transfer layer can be made up of a plurality of print layers applied in succession, and can for example also comprise a locally covering lamellar layer made of a printable material, for example dissolved natural rubber or PVC.

Preferably, a hot transfer method can also be used to mark substrate surfaces of washable and/or crumplable materials, such as textiles, films, or leather articles of clothing and the like. From a pre-printed release carrier film, a transfer layer on the release carrier film is transferred onto the material being printed by contact, under the action of heat, with the material, where it causes an adhesive image to appear that cannot be removed without destroying it.

In addition, using this and other transfer methods it is possible to transfer required colors in one pass. The print inks are transferred onto the surface of the material under the action of heat, and cannot be removed from the material without destroying the printed image. The printed image serves, for example using marks or signs, to label the respective material or products produced therefrom.

The products can be crumplable and washable, and correspondingly the inks used can also have these properties.

In particular on film-type substrates, transfer layers can also be transferred using the wet transfer method. The resulting image on the substrate is relatively brittle and cannot be removed without destroying it.

SUMMARY OF THE INVENTION

The object arises of technically expanding the possibilities of marking by means of transfer print methods, and to use additional marking possibilities beyond visual possibilities.

This object is achieved in a method of the type named above, in which the transfer layer also comprises at least one RFID module made up of at least one RFID chip and a planar printed antenna that was first printed on the release carrier film. The RFID module is also called a transponder.

RFID (radio frequency identification) devices are known from the prior art having built-in RFID assemblies (cf. EP 1 141 886 B1 and further references cited there). An RFID device can for example be a passive RFID label that bears an RFID assembly embedded therein. Such an assembly or circuit is also called a transponder. It comprises an RFID chip and an antenna. In order to read information in and out, an RFID read device is required that can use electromagnetic wave signals to request data from the chip of the RFID assembly and can induce the required operating energy. The read device receives the response signal and interprets the data contained therein, which can be transmitted to a computer by the read device. Information can be permanently stored in the RFID chip, and it is also possible to read in new information or to modify information. The data can be used to monitor sales processes and unauthorized removal, and in order to control stocks and deliveries. In this way, logistical processes and supply chains can be monitored.

As an adhesive image, in particular an RFID module is applied that is made up of an RFID chip and a printed flexible, preferably flat-lying, antenna, covered by a cover sheet made of a flexible plastic that is heat-resistant at least in the temperature range from −25° to 200° C.

The present invention exploits the possibility that in particular passive RFID modules are miniaturizable, and that the antenna required for the realization of the present invention can be printed. However, it is not to be excluded that the chip is also at least partly printed onto the release carrier film in an additional print process, and is transferred onto the substrate.

According to the present invention, miniaturized modules are used whose size is on the order of magnitude from a few millimeters to a few centimeters in diameter or in the diagonal dimension, and having a thickness of approximately 0.01 to 1 mm. In the case of substrates that are crumpled and heated during a washing process, the modules (transponders) must be correspondingly protected. The sheath is correspondingly to be produced in watertight fashion from a plastic. For this purpose, corresponding lacquer layers can be printed onto the release carrier film. A high degree of temperature resistance is provided, making it possible to wash the printed substrates.

The antenna of the transponder is made for example of a metallic material or a conductive polymer material. For this purpose, for example a conductive silver printing ink or a printing ink constructed with conductive polymers, for example based on polypyrrole or PPV (poly(para-phenylenevinylene)), is suitable. Printing inks based on conductive carbon (carbon black, C-fiber material) are also usable. After the printing of the antenna, a chip whose size is only a fraction of the surface area covered by the antenna is connected galvanically to the antenna via hot pressing, soldering, or gluing.

The antennas required for functioning are preferably printed separately in large numbers on a flexible, heat-resistant substrate that has the form of a roll, and are subsequently each connected to an RFID chip, in particular by gluing or soldering. Subsequently, the RFID assemblies, each having an associated surface segment of the substrate, are separated, or divided into narrower rolls.

In particular, it is advantageous to form a projection excess length of the substrate surrounding the RFID chip and the antenna as a sheath. For this purpose, a suitable material is an elastomer, for example a molten natural rubber (latex) or a dissolved plastic. Temperature-resistant, soft thermoplasts are suitable, e.g. softened polyacetal. Such materials can be produced in one pass as a sheet and can each be assigned to a transponder. Correspondingly, a sheath for the transponder can also be produced.

The RFID module (transponder) can be covered by a cover film sheet that is detachable from the release carrier film, and that seals the area of the transponder in airtight fashion on the substrate surface after the transferring. After the transfer process, an RFID module protected by a film is accordingly attached to the substrate, and protects the substrate against external influences.

The RFID module is a formation analogous to the printed image or transfer image, which adheres to the substrate and cannot be removed from it without destroying it. In addition to the RFID module, the transfer layer can comprise a printed color coat. Accordingly, the present invention comprises a specific embodiment in which the image layer transferred in the transfer print process consists solely of the RFID module, no additional color coat being used, or consists of a transponder combined with a color coat.

BRIEF DESCRIPTION OF THE DRAWINGS

An exemplary embodiment of the present invention is now explained on the basis of the drawing.

DETAILED DESCRIPTION OF THE DRAWINGS

Figure 1:
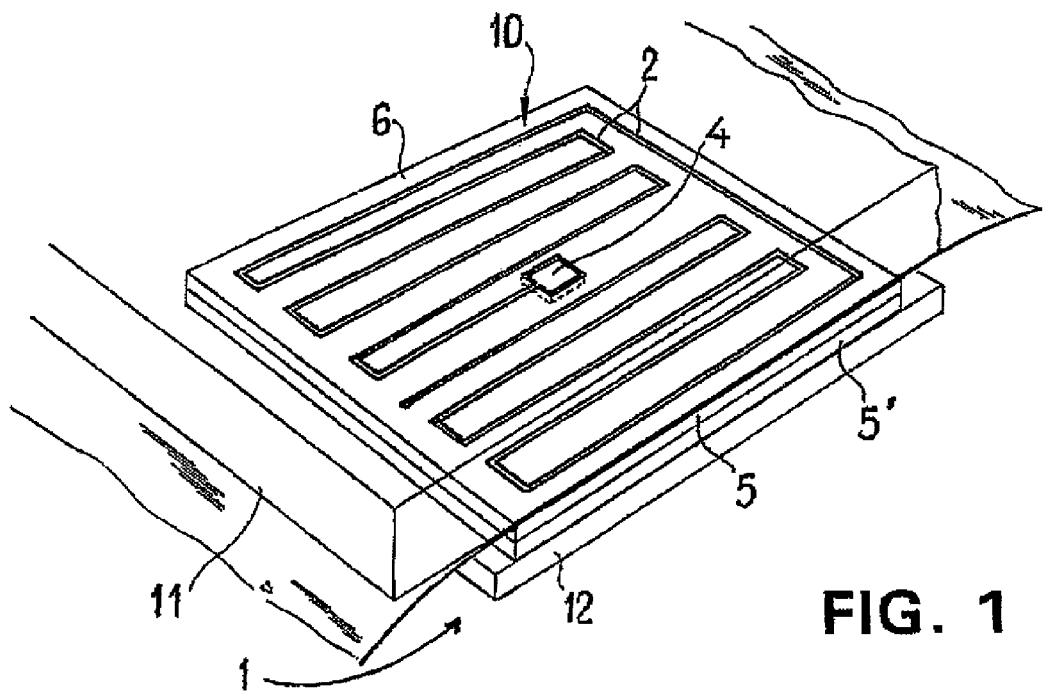
FIG. 1 shows a schematic representation of an RFID module placed onto a release carrier film, with sheath and surrounding color coat.

A marking suitable for a crumplable substrate 14, having an RFID module (transponder) 10, is produced according to the exemplary embodiment by printing, in the manner of lacquer, a cover film sheet 5 made of polyvinyl chloride onto a heat-resistant siliconized release carrier film 11. After the evaporation of the solvent, the cover film sheet 5 remains. An edge burr 6 of cover film sheet 5 projects over the subsequently printed antenna on all sides.

Using a screen printing method, a meandering antenna 2 is printed onto cover film sheet 5 using conductive printing ink based on a conductive polymer. As a conductive polymer, a printing ink mixture tinted with carbon black and based on PPV is used.

In the center area of antenna 2, a trough 3 is pressed in into which an RFID chip 4 is placed and is glued and galvanically connected to antenna 2. For this purpose, the chip is provided (covered) with corresponding terminal contacts that are glued to the antenna trace using electrically conductive glue. The thickness of the cover film sheet with the connected parts is approximately 0.5 mm. The side length is approximately 2.5 mm. RFID chip 4 is a so-called passive chip that does not have its own power supply, but rather has to be supplied with electrical energy inductively via the field produced by a transponder.

The creation of cover film sheet 5 with antenna 2 and chip 4 does not take place in single part manufacture, but rather in the form of comparatively large printable roller webs on which antennas 2 and RFID chips 4 are printed or arranged in a grid pattern in the named manner. The roller web can then be rolled up. By cutting, narrower rolls are obtained having individual transponders 10 on the release carrier film 11. In such antennas, the receive area of the transponder for a read device lies within a circumference of approximately 3 meters or more.

Other than in the immediate environment of RFID chip 4, cover film sheet 5 is highly flexible and capable of bending, with a bending radius of approximately 2 mm. It is temperature-resistant in wash cycles up to 95° C. Neither chip 4 nor antenna 2 are impaired in their functioning by the temperature of 95° C. over a time span of approximately 4 hours.

Cover film sheet 5 with RFID module 10 (antenna 2 and RFID chip 4) are called RFID sheet 20 in the following. RFID sheet 20 is situated in a particular position on a release carrier film 11. After a certain amount of strengthening has occurred, a further image layer 12, consisting of printing ink, is printed onto the cover film sheet using a screen printing method. The printing ink can be printed for example in the form of an ornament, a marking, or the like. An additional film sheet 5' can also be provided, so that a sheath is formed already on release carrier sheet 11.

Figure 2:
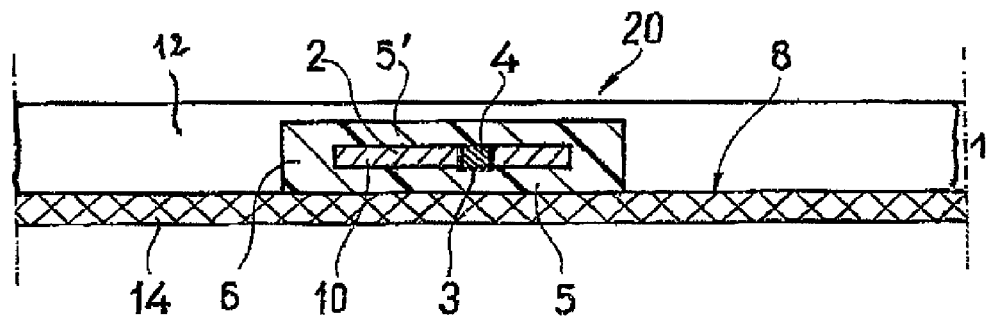
FIG. 2 shows a schematic representation of the RFID module bonded to a textile piece, with surrounding color coat.

In this way, after the drying of image layer 12 a transfer layer is created for the transfer. As is known, release carrier film 11 is placed, with a surface having a bonding agent, onto a substrate, here a textile material, and is briefly heated to approximately 80° to 160° C. Cover film sheet 5 presses against the substrate on all sides and seals the print ink, the antenna, and the chip. In this way, the RFID sheet having RFID chip 4 and antenna 5, i.e. the transponder, is applied onto textile material 14 using a transfer printing method (cf. FIG. 2).

In the exemplary embodiment, a textile material 14 in the form of a weave is provided with transponder 10. A part of the print ink 12 sublimates into the surface of textile 14.

Because the antenna is made of a flexible material that is not sensitive to heat, and thus can be applied directly with the standard print ink, a mass marking technique results in which each transponder acts as a marking, and can emit, but also receive, data in a technically outstanding manner.

In the exemplary embodiment, the material of the antenna has been chosen from the class of conductive polymers. However, other such polymers are also known, named as follows: cis-polyacetylene, trans-polyacetylene, poly(para-phenylene), polythiophene, polypyrrole, polyaniline.

However, for the antenna it is also possible to use printing inks based on metal dusts and metal fibers, or to mix carbon fibers or carbon black particles into such printing inks, in order to make them conductive.

It is essential is that the bending capacity of the antenna be preserved; this can be achieved through corresponding mixtures with flexible carrier elements.

The transition from the contacts of the RFID chip to the antenna is possible using adhesive connections, low-temperature soldering, or also pressure contact connections. Numerous other plastic materials are suitable as sheath films or cover sheets. These must be physiologically harmless, must retain their elasticity and flexibility over a large range, and must be electrically and electronically neutral. Here, polyacetal, as a temperature-resistant soft thermoplast, has proven to be a suitable film plastic.

For marking using a transfer method, rigid substrates surfaces are also suitable, such as wood, plastic, sheet metal, or massive metal cast parts. Cover film sheets can be produced from plastics that can be placed into a soluble or dispersible printing ink. All possibilities offered by transfer print methods may be used.

The transfer methods are not limited to hot transfer methods, but also include wet and dry transfer methods that take place in the temperature range 25° C.±10°.

As is apparent from the foregoing specification, the invention is susceptible of being embodied with various alterations and modifications which may differ particularly from those that have been described in the preceding specification and description. It should be understood that we wish to embody within the scope of the patent warranted hereon all such modifications as reasonably and properly come within the scope of our contribution to the art.

The invention claimed is:

1. A method for applying markings to a substrate surface made of textile material which is washable and capable of bending using a transfer method, comprising the steps:
    situating a detachable cover film sheet directly on a release carrier film without any intervening layer in between, said cover film sheet comprising a plastic that is temperature-resistant in the temperature range from −25 degrees to 200 degrees C.,
    printing at least an antenna using conductive ink onto said cover film sheet, applying an RFID chip onto said cover film sheet which, together with said antenna forms an image layer as an RFID module,
    transferring said cover film sheet with said image layer from said release carrier film onto the textile substrate surface, under the influence of heat, and adhering said cover film sheet onto the textile substrate surface in an airtight and watertight fashion, where the transferring causes said image layer an to appear as an adhesive image on the textile substrate surface that cannot be removed without destroying said image and where said cover film sheet covers said RFID module,
    thereby resulting in that said cover film sheet and said RFID module may only be destructively removed from the textile substrate surface.

2. The method as recited in claim 1, wherein the antenna is made of a metallic material.

3. The method as recited in claim 1, wherein the antenna is printed as one of a large number of antennas onto a large flexible, heat-resistant cover film sheet, and including the steps of connecting each antenna to an RFID chip and separating the antenna and RFID chip from the large cover film sheet by cutting the large cover film sheet into the cover film sheet.

4. The method as recited in claim 1, wherein after the transfer step, forming a projection of the cover film sheet as a sheath to surround the RFID chip and the antenna.

5. The method as recited in claim 1, wherein the cover film sheet is made of an elastomer.

6. The method as recited in claim 4, wherein the sheath is made of an elastomer.

7. The method as recited in claim 1, wherein the cover film sheet is made of a thermoplast.

8. The method as recited in claim 4, wherein the sheath is made of a thermoplast.

9. The method as recited in claim 1, wherein the antenna is made of a conductive polymer material.

10. The method as recited in claim 5, wherein the cover film sheet is made of natural rubber.

11. The method as recited in claim 6, wherein the sheath is made of natural rubber.

12. The method as recited in claim 7, wherein the cover film sheet is made of polyacetal.

13. The method as recited in claim 8, wherein the sheath is made of polyacetal.

14. The method as recited in claim 1, wherein a further image layer comprising printing ink is printed onto the cover film sheet in addition to said antenna.

15. A method for applying markings to a substrate surface made of textile material which is washable and capable of bending using a transfer method, comprising the steps:
    printing a detachable cover film sheet on a release carrier film, said cover film sheet comprising a plastic that is temperature-resistant in the temperature range from −25 degrees to 200 degrees C.,
    screen printing at least an antenna using conductive ink onto said cover film sheet, leaving an edge border of the cover film sheet surrounding the antenna on all sides,
    attaching an RFID chip onto said antenna carried on said cover film sheet in an electrically conductive manner and enclosing said RFID chip and said antenna with a sheath formed by a projection of said cover film sheet, said RFID chip, together with said antenna forming an image layer as an RFID module,
    transferring said cover film sheet with said image layer from said release carrier film onto the textile substrate surface, under the influence of heat, and adhering said cover film sheet onto the textile substrate surface in an airtight and watertight fashion, where the transferring causes said image layer to appear as an adhesive image on the textile substrate surface that cannot be removed without destroying said image and where said cover film sheet covers said RFID module,
    thereby resulting in that said cover film sheet and said RFID module may only be destructively removed from the textile substrate surface.

16. A method for applying markings to a substrate surface made of textile material which is washable and capable of bending using a transfer method, comprising the steps:
    printing a detachable cover film sheet on a release carrier film, said cover film sheet comprising a plastic that is temperature-resistant in the temperature range from −25 degrees to 200 degrees C.,
    screen printing at least an antenna using conductive ink onto said cover film sheet, leaving an edge border of the cover film sheet surrounding the antenna on all sides,
    attaching an RFID chip onto said antenna carried on said cover film sheet in an electrically conductive manner and enclosing said RFID chip and said antenna with a sheath formed by a projection of said cover film sheet, said RFID chip, together with said antenna forming an image layer as an RFID module,
    printing a further image layer onto said cover film sheet,
    transferring said cover film sheet with said image layer and said further image layer from said release carrier film onto the textile substrate surface, under the influence of heat, and adhering said cover film sheet onto the textile substrate surface in an airtight and watertight fashion, where the transferring causes said image layer to appear as an adhesive image on the textile substrate surface that cannot be removed without destroying said image and where said cover film sheet covers said RFID module, thereby resulting in that said cover film sheet and said RFID module may only be destructively removed from the textile substrate surface.

* * * * *